United States Patent
Szigeti et al.

(10) Patent No.: US 11,057,308 B2
(45) Date of Patent: Jul. 6, 2021

(54) USER- AND APPLICATION-BASED NETWORK TREATMENT POLICIES

(71) Applicant: Cisco Technology, Inc., San Jose, CA (US)

(72) Inventors: Thomas Szigeti, Vancouver (CA); David John Zacks, Vancouver (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 18 days.

(21) Appl. No.: 16/565,044

(22) Filed: Sep. 9, 2019

(65) Prior Publication Data

US 2021/0075733 A1    Mar. 11, 2021

(51) Int. Cl.
| | | |
|---|---|---|
| *H04L 12/851* | (2013.01) | |
| *H04L 12/833* | (2013.01) | |
| *H04L 12/725* | (2013.01) | |
| *H04L 12/727* | (2013.01) | |
| *H04L 12/813* | (2013.01) | |

(52) U.S. Cl.
CPC ........ *H04L 47/2433* (2013.01); *H04L 45/121* (2013.01); *H04L 45/302* (2013.01); *H04L 47/20* (2013.01); *H04L 47/2458* (2013.01)

(58) Field of Classification Search
CPC . H04L 47/2433; H04L 47/20; H04L 47/2458; H04L 45/121; H04L 45/302
See application file for complete search history.

(56) References Cited

U.S. PATENT DOCUMENTS

| | | | |
|---|---|---|---|
| 7,797,406 B2 | 9/2010 | Patel et al. | |
| 8,355,413 B2 | 1/2013 | Vasamsetti et al. | |
| 2007/0147243 A1* | 6/2007 | He | H04L 47/2408 370/230 |
| 2009/0190600 A1* | 7/2009 | Akahane | H04L 12/66 370/400 |
| 2013/0205002 A1* | 8/2013 | Wang | H04L 69/16 709/224 |
| 2014/0086056 A1* | 3/2014 | Casey | H04L 47/15 370/235 |
| 2016/0080285 A1 | 3/2016 | Ramachandran et al. | |
| 2016/0080502 A1* | 3/2016 | Yadav | H04L 47/22 709/227 |
| 2016/0212039 A1* | 7/2016 | Caputo, II | H04L 45/22 |
| 2017/0033997 A1* | 2/2017 | Burk | G06F 17/30598 |
| 2018/0097657 A1* | 4/2018 | Dao | H04L 47/12 |
| 2018/0152884 A1 | 5/2018 | Hu et al. | |
| 2019/0364492 A1* | 11/2019 | Azizi | H04W 52/0264 |
| 2020/0042350 A1* | 2/2020 | Deval | G06F 9/4881 |
| 2020/0059457 A1* | 2/2020 | Raza | H04L 12/4633 |

* cited by examiner

*Primary Examiner* — Ajay Cattungal
(74) *Attorney, Agent, or Firm* — Polsinelli PC (57) ABSTRACT

Systems, methods, and devices are disclosed for personalizing quality of service for network traffic. A user priority is assigned to a specific user and an application priority is assigned to a type of application. A header including an identifier is added to a packet from a client device associated with the type of application and the specific user in order to generate a modified packet. The identifier is based on a combination of the user priority associated with the specific user and an application priority. The modified packet is forwarded end to end through a network that is personalized to the specific user and the type of application by mapping a treatment policy to the identifier.

20 Claims, 4 Drawing Sheets

---

100

Assign a user priority to a specific user and an application priority to a type of application.
110

Add, to a packet from a client device associated with the type of application and the specific user, a header comprising an identifier to generate a modified packet, wherein the an identifier is based on a combination of the user priority associated with the specific user and an application priority.
120

Forward the modified packet end to end through a network that is personalized to the specific user and the type of application by mapping a treatment policy to the identifier.
130

```
                                                    ┌── 100
                                                   ✦
┌─────────────────────────────────────────────────────────────┐
│ Assign a user priority to a specific user and an application │
│                  priority to a type of application.          │
│                              110                             │
└─────────────────────────────────────────────────────────────┘
                              │
                              ▼
┌─────────────────────────────────────────────────────────────┐
│ Add, to a packet from a client device associated with the    │
│ type of application and the specific user, a header          │
│ comprising an identifier to generate a modified packet,      │
│ wherein the an identifier is based on a combination of the   │
│ user priority associated with the specific user and an       │
│ application priority.                                        │
│                              120                             │
└─────────────────────────────────────────────────────────────┘
                              │
                              ▼
┌─────────────────────────────────────────────────────────────┐
│ Forward the modified packet end to end through a network     │
│ that is personalized to the specific user and the type of    │
│ application by mapping a treatment policy to the identifier. │
│                              130                             │
└─────────────────────────────────────────────────────────────┘
```

FIG. 1

| DSCP | Application-Traffic Class | User-Tier |
|---|---|---|
| 0 | Default | Standard |
| 1 | Default | Privileged |
| 2 | Default | Courtesy |
| 3 | Scavenger | Courtesy |
| 4 | Bulk-Drop Preference 1 | Courtesy |
| 5 | Bulk-Drop Preference 2 | Courtesy |
| 6 | Bulk-Drop Preference 3 | Courtesy |
| 7 | Transactional Data-Drop Preference 1 | Courtesy |
| 8 | Scavenger | Standard |
| 9 | Scavenger | Privileged |
| 10 | Bulk-Drop Preference 1 | Standard |
| 11 | Bulk-Drop Preference 1 | Privileged |
| 12 | Bulk-Drop Preference 2 | Standard |
| 13 | Bulk-Drop Preference 2 | Privileged |
| 14 | Bulk-Drop Preference 3 | Standard |
| 15 | Bulk-Drop Preference 3 | Privileged |
| 16 | OAM | Courtesy |
| 17 | Transactional Data-Drop Preference 2 | Standard |
| 18 | Transactional Data-Drop Preference 1 | Privileged |
| 19 | Transactional Data-Drop Preference 1 | Standard |
| 20 | Transactional Data-Drop Preference 2 | Privileged |
| 21 | Transactional Data-Drop Preference 2 | Standard |
| 22 | Transactional Data-Drop Preference 3 | Privileged |
| 23 | Transactional Data-Drop Preference 3 | Standard |
| 24 | Signaling | Courtesy |
| 25 | Transactional Data-Drop Preference 3 | Standard |
| 26 | Multimedia-Streaming-Drop Preference 1 | Privileged |
| 27 | Multimedia-Streaming-Drop Preference 1 | Standard |
| 28 | Multimedia-Streaming-Drop Preference 2 | Privileged |
| 29 | Multimedia-Streaming-Drop Preference 2 | Standard |
| 30 | Multimedia-Streaming-Drop Preference 3 | Privileged |
| 31 | Multimedia-Streaming-Drop Preference 3 | Standard |
| 32 | Real-Time Interactive | |
| 33 | Real-Time Interactive | Privileged |
| 34 | Multimedia-Conferencing-Drop Preference 1 | Standard |
| 35 | Multimedia-Conferencing-Drop Preference 1 | Privileged |
| 36 | Multimedia-Conferencing-Drop Preference 2 | Standard |
| 37 | Multimedia-Conferencing-Drop Preference 2 | Privileged |
| 38 | Multimedia-Conferencing-Drop Preference 3 | Standard |
| 39 | Multimedia-Conferencing-Drop Preference 3 | Privileged |
| 40 | Broadcast-Video | Standard |
| 41 | Broadcast-Video | Privileged |
| 42 | Multimedia-Streaming-Drop Preference 1 | Courtesy |
| 43 | Multimedia-Streaming-Drop Preference 2 | Courtesy |
| 44 | Voice-ADMIT | Standard |
| 45 | Voice-Telephony | Privileged |
| 46 | Voice-Telephony | Standard |
| 47 | Voice-Telephony | Privileged |
| 48 | Network Control | |
| 49 | Multimedia-Streaming-Preference 3 | Courtesy |
| 50 | Real-Time Interactive | Courtesy |
| 51 | Multimedia-Conferencing-Drop Preference 1 | Courtesy |
| 52 | Multimedia-Conferencing-Drop Preference 2 | Courtesy |
| 53 | Multimedia-Conferencing-Drop Preference 3 | Courtesy |
| 54 | Broadcast-Video | Courtesy |
| 55 | Voice-ADMIT | Courtesy |
| 56 | Reserved Control Plane | |
| 57 | Voice-Telephony | Courtesy |
| 58 | | |
| 59 | | |
| 60 | | |
| 61 | | |
| 62 | | |
| 63 | | |

FIG. 4

USER- AND APPLICATION-BASED NETWORK TREATMENT POLICIES

TECHNICAL FIELD

The present disclosure relates in general to the field of computer networking, and more particularly, to systems and methods for improving the operation of a network.

BACKGROUND

Application treatment policies, such as Quality of Service (QoS) policies that can be used to manage bandwidth usage as data crosses computer networks, can be application-centric (e.g., applied on a per application basis). However, this lacks personalization. The lack of personalization arises because policies do not incorporate user-information (specifically, it cannot identify an IP flow with a specific user within a given policy construct). However, there are many use-cases where QoS policies are desired to be applied to not just an application, but the combination of both the user and application.

For example, many users may be making Telepresence calls in a given location. One user can be an executive making the Telepresence call, who may be deemed to have a higher business priority than an engineer making a Telepresence call at the same location. Similarly, many industry verticals have need for tiers of users, such as premium-users, standard-users and guest-users. Some large organizations (in particular government and military), need many tiers of users and a corresponding strict-ranking of importance between these tiers. As such, having an effective, comprehensive and flexible (i.e. brownfield-compatible) method of applying a QoS policy for nor only applications, but users as well, is highly desirable to enabling such use-cases.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 2 shows an example diagram of a user-tier assignment in accordance with some embodiments;

DESCRIPTION OF EXAMPLE EMBODIMENTS

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Overview

In some embodiments, a method for personalizing quality of service for network traffic. A user priority is assigned to a specific user and an application priority is assigned to a type of application. A header including an identifier is added to a packet from a client device associated with the type of application and the specific user in order to generate a modified packet. The identifier is based on a combination of the user priority associated with the specific user and an application priority. The modified packet is forwarded end to end through a network that is personalized to the specific user and the type of application by mapping a treatment policy to the identifier.

In some embodiments, the user priority of the specific user is assigned based on the specific user falling within one of a plurality of tiers of users, wherein a higher tier is given priority over a lower tier.

In some embodiments, the specific user is identified through scalable group tags associated with the assigned one of the plurality of tiers of users.

In some embodiments, a DSCP value is added to the header of the packet. Based on the DSCP value, the modified packet is sorted by the specific user. Based on the sorted modified packets, the sorted modified packets are sorted based on an application tier.

In some embodiments, differentiation within an application queue by user-tier is achieved via custom-tuned DSCP-based WRED policies by selectively dropping the modified packet when a buffering threshold based on the application type has been reached, wherein within the buffering threshold, lower priority users are randomly dropped before higher priority users.

In some embodiments, the treatment policy includes one or more policies for routing decisions, path selection, performance routing, or traffic copy, wherein the treatment policy is tied to a flexible classification method based on the combination of both the user priority and the application priority.

In some embodiments, the treatment policy includes one or more of parameters associated with delay, throughput, bandwidth, latency, and loss characteristics associated with a traffic type.

In some embodiments, the treatment policy is associated with one or more parameters of a service level agreement.

In some embodiments, a system for personalizing quality of service for network traffic is disclosed. A user priority is assigned to a specific user and an application priority is assigned to a type of application. A header including an identifier is added to a packet from a client device associated with the type of application and the specific user in order to generate a modified packet. The identifier is based on a combination of the user priority associated with the specific user and an application priority. The modified packet is forwarded end to end through a network that is personalized to the specific user and the type of application by mapping a treatment policy to the identifier.

In some embodiments, a non-transitory computer-readable medium includes instructions stored thereon, the instructions executable by one or more processors of a computing system to personalize quality of service for network traffic. A user priority is assigned to a specific user and an application priority is assigned to a type of application. A header including an identifier is added to a packet from a client device associated with the type of application and the specific user in order to generate a modified packet. The identifier is based on a combination of the user priority associated with the specific user and an application priority. The modified packet is forwarded end to end through a network that is personalized to the specific user and the type of application by mapping a treatment policy to the identifier.

Example Embodiments

The disclosed technology addresses the need in the art for personalizing QoS policies, so that network traffic can be managed on both a per-user and a per-application basis. In this way, specific individuals may be given priority over other individuals when bandwidth is managed. For example, in some embodiments a Software Defined Experience (SDX) service can enable an Intent-Based Networking (IBN) service of provisioning treatment policies across a campus and/or WAN fabric that is both user- and application-based).

Functionality of the IBN service can include, in some embodiments, abstracting user- and application-based treatment policies (which, in some instances, can include not only QoS, but also Path Selection, Performance Routing, Traffic Copy, etc.) to an intent-based model based on user-tiers. A user-tier, for example, can be a three tier model consisting of privileged users, standard-users, and courtesy/guest-users (in order of decreasing priority). The IBN service can then provision end-to-end network policies that correspond to the user and application combination of QoS via a network controller. In some embodiments, the use of a network controller can be mandated due to policy complexity.

The IBN service can enable a differentiated treatment across network devices that corresponds to not only what the application is, but also the identity of the user of the application. As discussed in more detail herein (see FIGS. 2 and 3), such an intent-based treatment can be available even on (standards-based) brownfield devices (such as within the Differentiated Services Code Point field of IPv4 and IPv6 packets), can identify individual users with a scalable method that does not rely on IP addresses (or subnets), and cam identify applications (including encrypted applications) (such as via Network Based Application Recognition (NBAR2).

Figure 1:
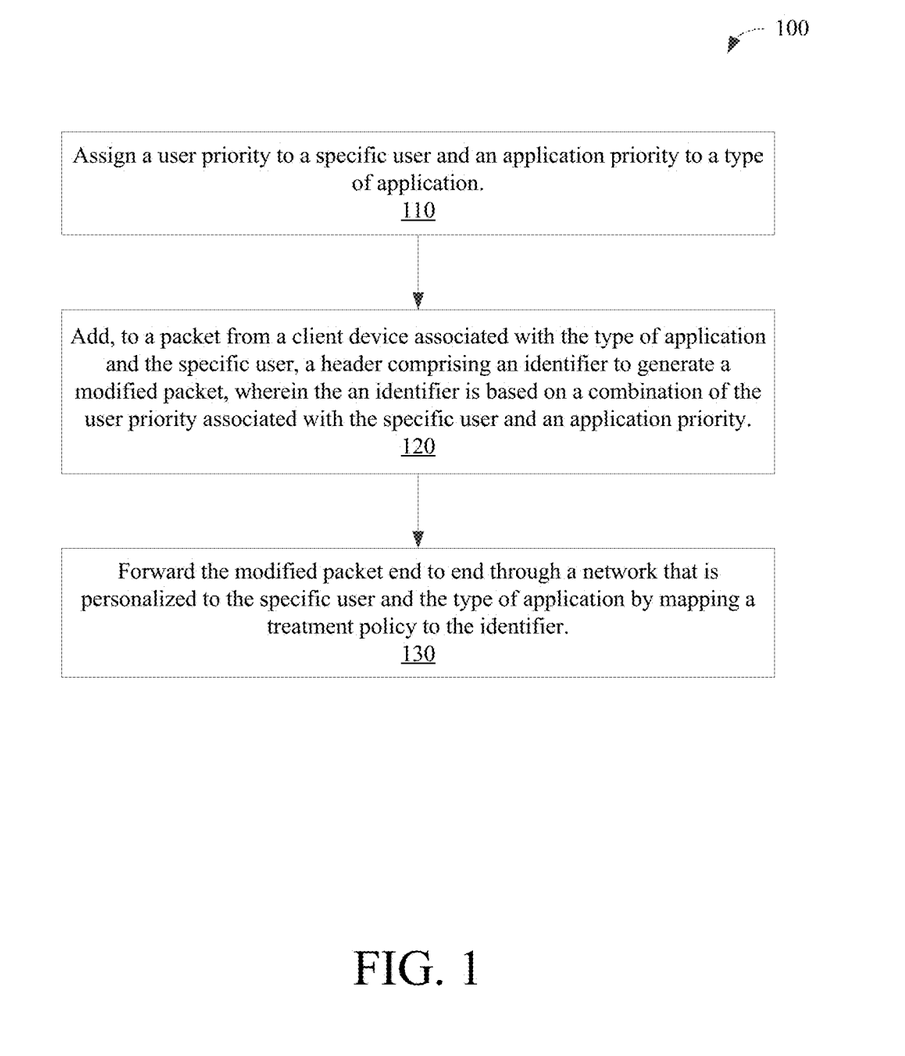
FIG. 1 is a flowchart representation of an example implementation of personalizing quality of service for network traffic in accordance with some embodiments.

FIG. 1 is a flowchart representation of an example implementation of personalizing quality of service for network traffic in accordance with some embodiments. A method (100) for personalizing quality of service for network traffic can include assigning (110) a user priority to a specific user and an application priority to a type of application. The user priority of the specific user can be assigned based on the specific user falling within one of multiple tiers of users, where a higher tier is given priority over a lower tier. For example, an executive can be given a higher priority based on being assigned to a higher tier than, say, an entry level employee. Or a General may be given a higher priority based on being assigned to a higher tier than a Cadet. Similarly, applications may be assigned a priority based on its type—voice over Internet Protocol (VoIP) for conference calls, for example, can be given priority over email applications.

In some embodiments, the assignment can be designated as an identifier that includes both the user priority and the application priority. For example, the identifier can be a weighted value that corresponds to both user and application priorities, A header can be added (120) to a packet from a client device associated with the type of application and the specific user in order to generate a modified packet. The header can include the identifier, such as an identifier based on a combination of the user priority associated with the specific user and an application priority. For example, in some embodiments a Differentiated Services Code Point (DSCP) value (e.g., the identifier that includes both user- and application-based priorities) can be added to the header of the packet. Based on the DSCP value, the modified packet can be sorted by the specific user. Once the modified packets have been sorted, the modified packets can be sorted based on the application tier. In this way, the priorities for both the specific user and the specific application are reflected in the packet's management within the network.

The modified packet can then be forwarded (130) end to end through the network in a way that is personalized to the specific user and the type of application. For example, the forwarding can be based on mapping a treatment policy to the identifier. For example, the identifier can map the identifier to policies based on user tiers as well as application tiers (e.g., a General may receive priority over a Cadet for email traffic, even if email is a lower application priority than the Cadet using a VoIP, because the identifier still places the General at a much higher user-tier, and vice versa). In other words, the treatment policy can be tied to a flexible classification method based on the combination of both the user priority and the application priority.

In some embodiments, the specific user can be identified through scalable group tags (SGTs) associated with the assigned user tiers. The treatment policies can include one or more policies related to, but not limited to, routing decisions, path selection, performance routing, and/or traffic copy. Parameters of the policies can be, but is not limited to, one or more of parameters associated with delay, throughput, bandwidth, latency, and/or loss characteristics associated with a traffic type. In some embodiments, the treatment policy can be associated with one or more parameters of a service level agreement.

Figure 3:
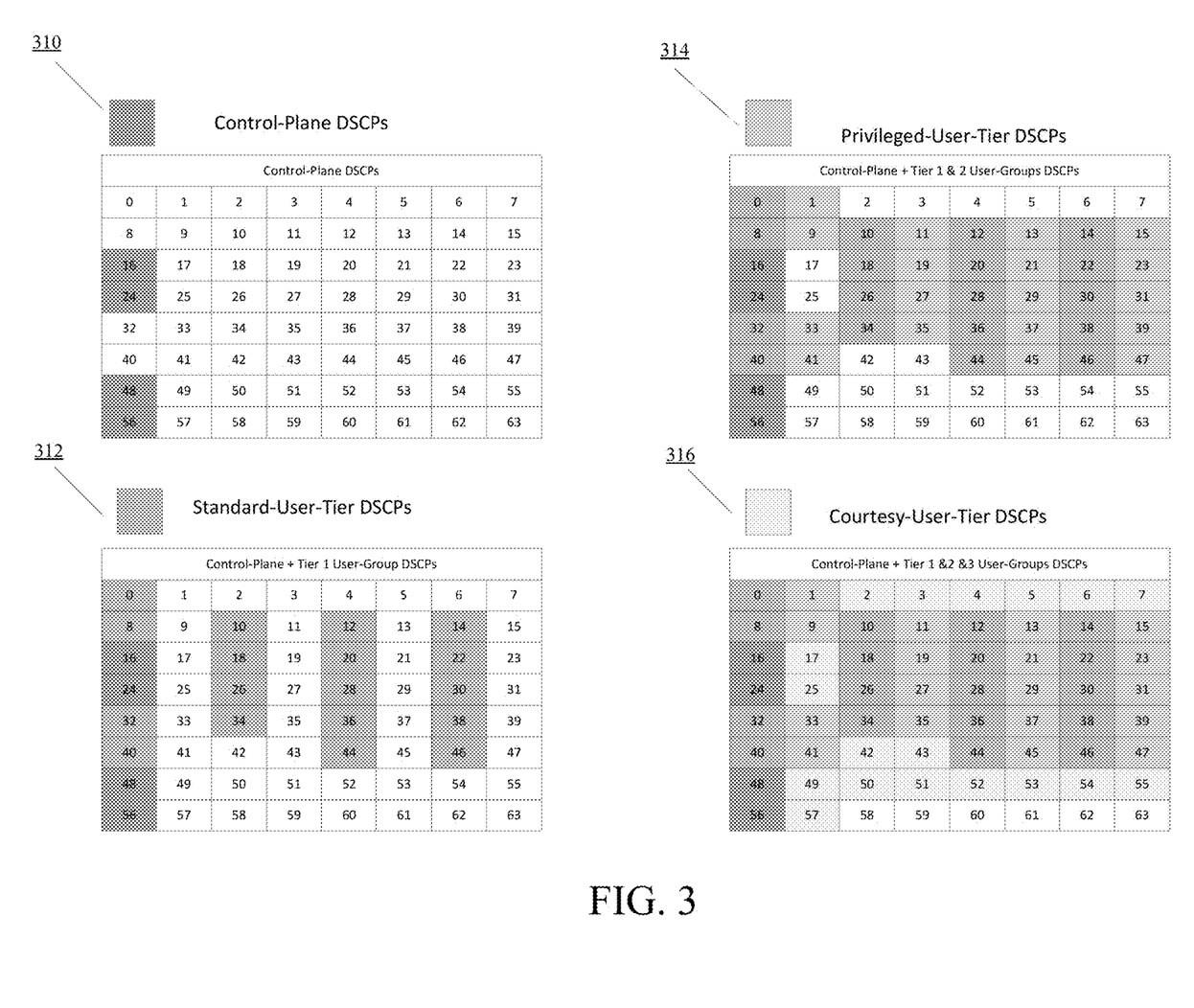
FIG. 3 shows example diagram of control planes including user-tier assignment in accordance with some embodiments.

FIGS. 2 and 3 show example diagrams of user-tier assignment and mapping to treatment policies in accordance with some embodiments. In FIG. 2, the identifier 210 (e.g., DSCP value) added to the packet header can be mapped to both an application traffic class 212 and a user tier 214. For example, the DSCP value 41 is mapped to a broadcast-video application tier (which may have a higher priority than applications within the default application tier [e.g., see DSCP values 0-2]), and is further mapped to a privileged user tier (which may have a higher priority than the standard user tier).

For example, an intent-based networking solution can provide a way of abstracting application policy complexity from network operators. Rather than configure QoS markings, queues, bandwidth allocations and drop-thresholds, all an operator has to express is one of three designations for an application (or set of applications), namely (1) relevance of the application to the enterprise, (2) whether the application is important enough to protect bandwidth for, and (3) whether the application is irrelevant to the enterprise. In other words, if the application type is on network, but it really shouldn't be, then if bandwidth becomes scarce then the irrelevant applications types in (3) should be penalized in favor of enterprise-relevant apps (e.g., penalize Facebook in favor of conferencing applications). In some embodiments, any application that are not explicitly assigned as enterprise-relevant or enterprise irrelevant can be left in a "Default" treatment, which corresponds to a neutral networking treatment (e.g., neither penalized nor prioritized over other application types).

The intent-based approach for application type can be similarly applied to tiers of users. A user (or group of users) can be assigned, for example, to one of three levels of treatment: Privileged Users, Standard-Users, and Courtesy Users (although any number of user tiers can be utilized depending on the hierarchy/needs of the enterprise).

FIG. 3, for example, shows example diagrams of user-tier assignment in accordance with some embodiments. Diagram 310 shows control plane identifiers, which spans DSCPs 16, 24, 48, and 56 corresponding to the Operations, Administration and Management (OAM) control plane, the Signaling control plane, the Network control plane, and the Reserved control plane, respectively. Diagram 312 adds the standard user tier identifiers, which span the DSCPs of 0, 8, 10, 12, 14, 18, 20, 22, 26, 28, 30, 34, 36, 38, 44, and 46 as described in FIG. 2. Diagram 314 further adds the highest tier privileged user tier identifiers, which span the DCSPs of 1, 9, 11, 13, 15, 19, 21, 23, 27, 29, 31, 33, 35, 37, 39, 41, 45, and 47 as also described in FIG. 2. Finally, diagram 316 adds the lowest tier courtesy user tier identifiers, which span DSCPs 2-7, 17, 25, 42-43, 49-55, and 57 as described in FIG. 2. These DSCPs are mapped to the application traffic class and user tier illustrated in FIG. 2, informing the network on how to handle bandwidth based on both the specific user and the application type.

In some embodiments, for example, the mapping is done within an Identity Services Engine (ISE) by associating specific scalable group tags (SGTs) with the user tiers. This mapping can allow for policy abstraction at the device level. For example, a network controller can express this policy abstraction across the network. In some embodiments, at all access-edges of the network (wired and wireless), classification and marking policies would be deployed. Classification policies, for example, would match both the SGTs and the on Network Based Application Recognition (NBAR2) application signatures. This allows the controller to deploy both user- and application-based policies.

In some embodiments, to simplify policy expression and to improve scalability of intent, policies can be applied to user tiers to which SGTs have been previously mapped to in ISE or a controller, as noted above. Policies may also be applied to application traffic classes through an NBAR2 attribute (an intent-based policy construct). Finally, policies may also be applied to application business relevance—another NBAR2 attribute (also an intent-based policy construct).

In some embodiments, marking policies can encode the resulting combination of user tiers and application type tiers within the Differentiated Services Code Point (DSCP) of a packet, thus enabling the policy treatment for this traffic to subsequently be treated appropriately and consistently across both greenfield and brownfield network devices —even when those devices are not themselves capable of defining policies based on the more complex combination of the user tiers and application type tiers classification. By leveraging the full range of available DSCP values, as indicated in FIGS. 2-3, a complete set of differentiated user tiers and application type tiers queueing policies can be enabled network-wide, even on devices that cannot themselves perform the full (user tiers plus application type tiers) classification. This thus enables user- and application-based policies network-wide, even for brownfield/legacy device types—thus providing significant investment protection for customer deployments.

These classification and marking policies can be complemented with traffic treatment policies. For example, in relation to Quality of Service policies, such traffic-treatment policies could include, but is not limited to: hierarchical queuing policies that queue first (i.e. pre-sort) by user-tier and then queue by application traffic-class, and/or custom-tuned DSCP-based weighted random early detect (WRED) policies (which can support any/all standards-based brownfield devices).

Hierarchical queuing policies, for example, can queue traffic first by user-tier (for example, Privileged-Users would receive preferential treatment over Standard-Users, which in turn would receive preferential treatment over Courtesy-Users). Traffic would be pre-sorted by user tier, and then subsequently queued by application traffic-class.

Alternatively, differentiation within an application queue by user tier can be achieved via custom-tuned DSCP-based WRED policies by selectively dropping the modified packet when a buffering threshold based on the application type has been reached. For each application type, when the corresponding buffering threshold has been met or is within a threshold of being met, lower priority users are randomly dropped before higher priority users. For example, if the bandwidth allocated to just broadcast-video traffic will be exceeded, then a standard tier user would be randomly dropped (e.g., randomly dropped from all standard users) before a privileged user. If all standard tier users are dropped, then a privileged user is randomly dropped from all privileged users.

The disclosure herein therefore provides enterprise network operators the ability to assign granular policy treatment to users and the applications they run. For example, an executive running a Telepresence application will receive a superior network service than an engineer running the same application, who in turn will receive superior service than a contractor running the same application. The method proposed is both intent-based and scalable. These abilities are enabled based on an intent-based networking solution for application policy that includes user-information within the policy.

The disclosed techniques are flexible enough to work on both greenfield and brownfield environments and leverages enterprise fabric architectures to enable entirely new use cases—use cases which are extremely valuable to network managers wishing to prioritize both various user levels as well as applications within their existing, deployed (brownfield) as well as greenfield network environments.

It is important to note that, although the examples provided above all reference QoS policies tied to the user- and application-based classification provided by this invention, a person of ordinary skill in the art could apply these techniques to additional/other polices equally well. For example, these could include policies for Path Selection, Performance Routing, Traffic Copy, or other functions, all tied to a flexible classification method based on a combination of both user and application tiers.

Figure 4:
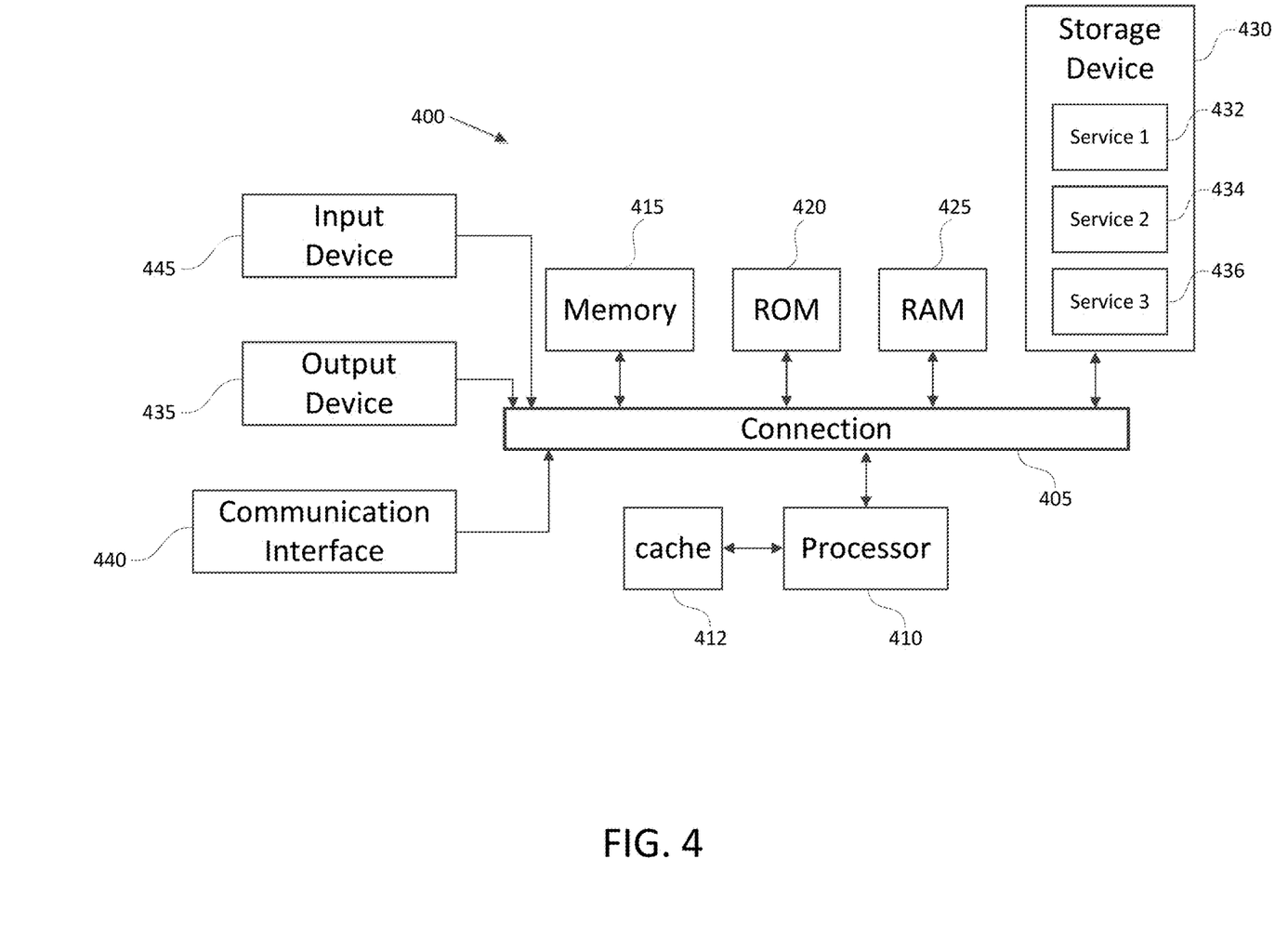
FIG. 4 shows an example of a system for implementing certain aspects of the present technology.

FIG. 4 shows an example of computing system 400 in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments computing system 400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read only memory (ROM) and random access memory (RAM) to processor 410. Computing system 400 can include a cache of high-speed memory connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for personalizing quality of service for network traffic comprising:

assigning a user priority to a specific user and an application priority to a type of application;

adding, to at least one packet from a client device associated with the specific user and the type of application, a header comprising at least a Differentiated Services Code Point value to generate at least one modified packet, wherein the at least one Differentiated Services Code Point value is based on a combination of the user priority associated with the specific user and the application priority;

based on the at least one Differentiated Services Code Point value, sorting, by the specific user, the at least one modified packet and a plurality of other packets; and forwarding the at least one modified packet end to end through a network that is personalized to the specific user and the type of application by mapping a treatment policy to the identifier.

2. The method of claim 1, wherein the user priority of the specific user is assigned based on the specific user falling within one of a plurality of tiers of users, wherein a higher tier is given priority over a lower tier.

3. The method of claim 2, wherein the specific user is identified through scalable group tags associated with the assigned one of the plurality of tiers of users.

4. The method of claim 1, further comprising:
sorting the sorted modified packets based on an application tier.

5. The method of claim 1, wherein differentiation within an application queue by user-tier is achieved via custom-tuned Differentiated Services Code Point-based weighted random early detect policies by selectively dropping the modified packet when a buffering threshold based on the application type has been reached, wherein within the buffering threshold, lower priority users are randomly dropped before higher priority users.

6. The method of claim 1, wherein the treatment policy includes one or more policies for routing decisions, path selection, performance routing, or traffic copy, wherein the treatment policy is tied to a flexible classification method based on the combination of both the user priority and the application priority.

7. The method of claim 1, wherein the treatment policy comprises one or more of parameters associated with delay, throughput, bandwidth, latency, and loss characteristics associated with a traffic type.

8. The method of claim 1, wherein the treatment policy is associated with one or more parameters of a service level agreement.

9. A system comprising:
one or more processors; and
at least one computer-readable storage medium having stored therein instructions which, when executed by the one or more processors, cause the one or more processors to:
assign a user priority to a specific user and an application priority to a type of application;
add, to at least one packet from a client device associated with the specific user and the type of application, a header comprising at least a Differentiated Services Code Point value to generate at least one modified packet, wherein the at least one Differentiated Services Code Point value is based on a combination of the user priority associated with the specific user and the application priority;
based on the at least one Differentiated Services Code Point value, sort, by the specific user, the at least one modified packet and a plurality of other packets; and
forward the at least one modified packet end to end through a network that is personalized to the specific user and the type of application by mapping a treatment policy to the identifier.

10. The system of claim 9, wherein the user priority of the specific user is assigned based on the specific user falling within one of a plurality of tiers of users, wherein a higher tier is given priority over a lower tier.

11. The system of claim 10, wherein the specific user is identified through scalable group tags associated with the assigned one of the plurality of tiers of users.

12. The system of claim 9, the one or more processors are further caused to:
sort the sorted modified packets based on an application tier.

13. The system of claim 9, wherein differentiation within an application queue by user-tier is achieved via custom-tuned Differentiated Services Code Point-based weighted random early detect policies by selectively dropping the modified packet when a buffering threshold based on the application type has been reached, wherein within the buffering threshold, lower priority users are randomly dropped before higher priority users.

14. The system of claim 9, wherein the treatment policy includes one or more policies for routing decisions, path selection, performance routing, or traffic copy, wherein the treatment policy is tied to a flexible classification method based on the combination of both the user priority and the application priority.

15. A non-transitory computer-readable storage medium having stored therein instructions which, when executed by a processor, cause the processor to perform operations comprising:
assigning a user priority to a specific user and an application priority to a type of application;
adding, to at least one packet from a client device associated with the specific user and the type of application, a header comprising at least a Differentiated Services Code Point value to generate at least one modified packet, wherein the at least a Differentiated Services Code Point value is based on a combination of the user priority associated with the specific user and the application priority;
based on the at least one Differentiated Services Code Point value, sorting, by the specific user, the at least one modified packet and a plurality of other packets; and
forwarding the at least one modified packet end to end through a network that is personalized to the specific user and the type of application by mapping a treatment policy to the identifier.

16. The non-transitory computer-readable storage medium of claim 15, wherein the user priority of the specific user is assigned based on the specific user falling within one of a plurality of tiers of users, wherein a higher tier is given priority over a lower tier.

17. The non-transitory computer-readable storage medium of claim 16, wherein the specific user is identified through scalable group tags associated with the assigned one of the plurality of tiers of users.

18. The non-transitory computer-readable storage medium of claim 15, the processor further caused to perform the operations comprising:
sorting the sorted modified packets based on an application tier.

19. The non-transitory computer-readable storage medium of claim 15, wherein differentiation within an application queue by user-tier is achieved via custom-tuned Differentiated Services Code Point-based weighted random early detect policies by selectively dropping the modified packet when a buffering threshold based on the application type has been reached, wherein within the buffering threshold, lower priority users are randomly dropped before higher priority users.

20. The non-transitory computer-readable storage medium of claim 15, wherein the treatment policy includes one or more policies for routing decisions, path selection, performance routing, or traffic copy, wherein the treatment policy is tied to a flexible classification method based on the combination of both the user priority and the application priority.

* * * * *